United States Patent [19]

Kraus

[11] 3,734,061
[45] May 22, 1973

[54] BIRD FEEDING DEVICE

[76] Inventor: Dixie Valentine Kraus, 25000 Hawkbryn, Avenue, Space 44, Newhall, Calif. 91321

[22] Filed: Jan. 24, 1972

[21] Appl. No.: 220,331

[52] U.S. Cl. ................................................119/52 R
[51] Int. Cl. ................................................A01k 5/00
[58] Field of Search .....................119/51.5, 52 R, 61, 119/24, 26

[56] References Cited

UNITED STATES PATENTS

| 1,575,101 | 3/1926 | Edwards | 119/24 X |
| 2,298,398 | 10/1942 | Marshaus | 119/51.5 |
| 954,968 | 4/1910 | Jocoy | 119/52 R |
| 1,067,824 | 7/1913 | Leichtfuss | 119/52 R |
| 2,591,459 | 4/1952 | Meany | 119/52 R |
| 2,875,729 | 3/1959 | Gibson | 119/52 R |

FOREIGN PATENTS OR APPLICATIONS

| 79,753 | 5/1894 | Germany | 119/52 R |
| 373,306 | 5/1932 | Great Britain | 119/52 R |

Primary Examiner—Hugh R. Chamblee
Assistant Examiner—J. A. Oliff
Attorney—John J. Posta, Jr.

[57] ABSTRACT

The device comprises a generally vertically oriented feed dispenser, an elongated support member for the dispenser, a releasable connector interconnecting the support member and the dispenser, and a bird perch assembly encircling the feed dispenser.

The perch assembly includes a generally inverted frustroconical basket secured to the elongated support member and an inner ring supported within the basket at about the level of the dispenser. The releasable connector may include a ball secured to the bottom of the basket and spring blades secured to the bottom of the dispenser which can releasably engage the ball.

7 Claims, 3 Drawing Figures

PATENTED MAY 22 1973 3,734,061

BIRD FEEDING DEVICE

BACKGROUND OF THE INVENTION

1. Field of the Invention

The invention generally relates to bird feeding devices.

2. Description of Prior Art

Some bird feeders are of the massive permanent fixed type. As such, they are usually fabricated of stone or the like and normally do not provide for easy disengagement of the feeder section from its fixed supports, so that cleaning and/or refilling may be difficult or inconvenient. Moreover, feeders which have disengageable top feeding sections frequently do not include those self-centering means which permit easy realignment and reassembly of the disengaged parts.

To be of the most benefit, bird feeders should be inexpensive, attractive, portable and easily cleaned, maintained, assembled and disassembled. Moreover, preferably such feeders should provide for the simultaneous feeding of a plurality of types and sizes of birds. It would also be desirable to make such feeders useful for the dispensing of both liquid and granular feed in a manner which maintains the feed in a sanitary condition.

SUMMARY OF THE INVENTION

The improved bird feeder device of the invention is substantially as described in the Abstract above. The lower end of the device is adapted to be driven into the ground, so that the remaining components of the device are disposed in an upright position above the ground. The device is also characterized by being attractive, inexpensive, portable and capable of simultaneously feeding birds of various sizes, including humming birds and similar small birds, as well as larger birds, such as sparrows, robins, larks and the like.

The device can dispense either liquid or granular (seeds or the like) feed in a sanitary way, and includes means for easily disengaging the feed container and dispenser for cleaning and refilling, and for easily, quickly and properly reassembling the same with the rest of the feeder. The latter is accomplished through the use of self-centering and aligning components.

DESCRIPTION OF THE PREFERRED EMBODIMENT

Figure 1:
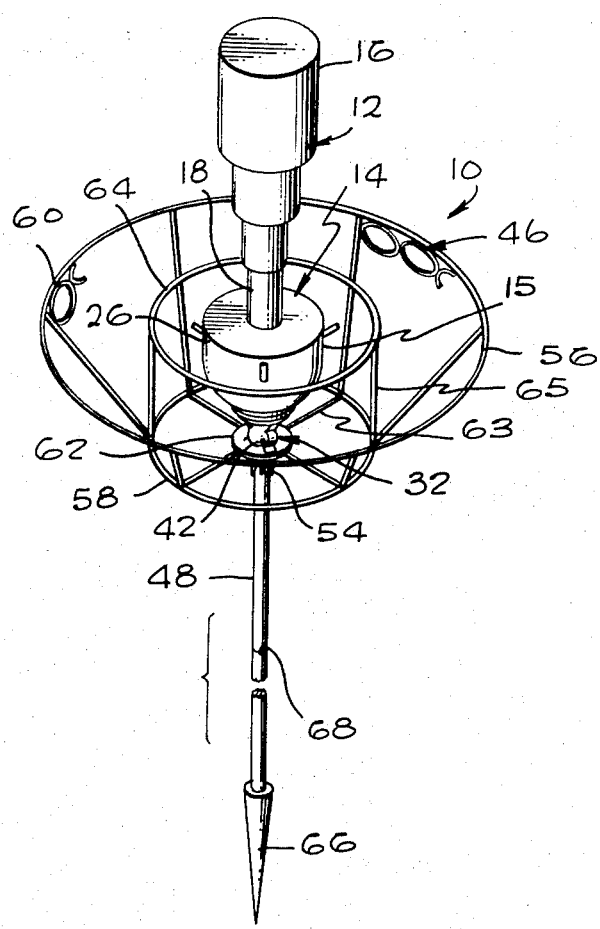
FIG. 1 is a schematic perspective view of a preferred embodiment of the improved bird feeding device of the invention.
Figure 3:
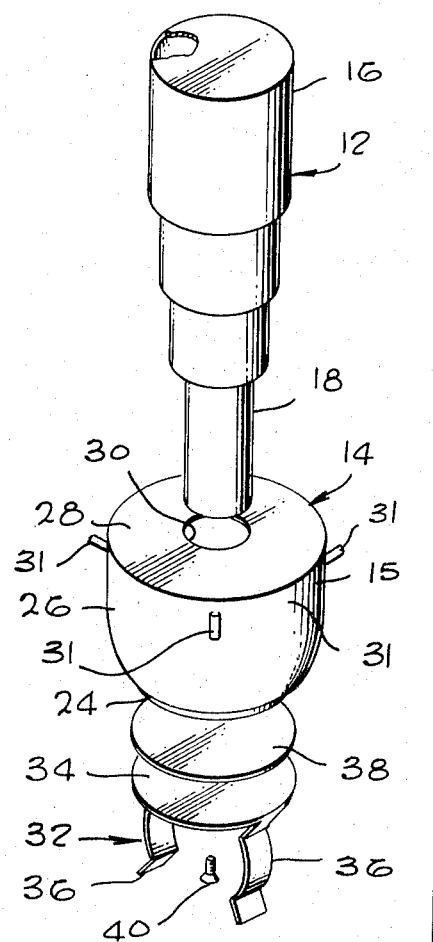
FIG. 3 is an exploded view of certain components of FIG. 1.
Figure 2:
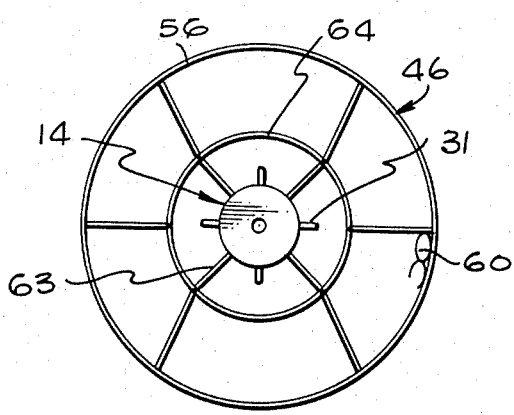
FIG. 2 is a schematic top plan view of the basket portion of the device of FIG. 1.
Figure 2:
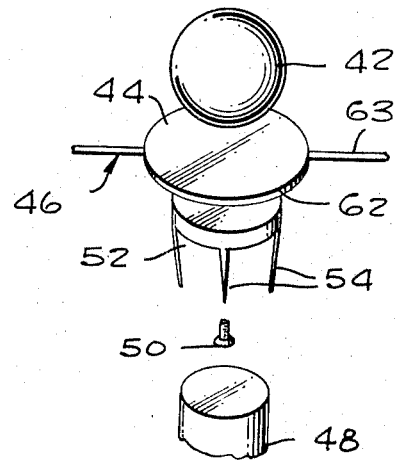

In FIG. 1, an improved, vertically oriented bird feeding device 10 is illustrated schematically in perspective view. Device 10 includes generally vertically oriented feed containing means comprising a hollow feed container 12 and a hollow feed dispenser 14. Feed container 12 can be of any desired shape and size.

As depicted in FIG. 1, container 12 is generally cylindrical and has an open upper end 16 and a necked down open lower end 18. End 16 may be closed (as shown) or covered with a removably top lid (not shown). End 18 may be provided with a feed control device such as a removable perforated cork or the like (not shown) particularly where a liquid, such as water containing dissolved sugar is to be disposed in container 12.

Dispenser 14 may comprise a hollow bowl 15 having a closed bottom end 24 and an open upper end 26 covered by a lid or fixture 28 with a central aperture 30 therein through which end 18 of container 12 extends and is supported vertically therein. Dispenser 14 includes hollow feeder tubes 31 for controllably dispensing feed therefrom. Dispenser 14 is releasably secured to the remainder of device 10 through connecting means which include a spring member 32 comprising a central plate 34 and a plurality of spaced downwardly extending spring blades 36. Spring member 32 is secured to the bottom end 24 of dispenser 14 by a support plate 38 attached to dispenser 14, as by glue, etc., and a screw 40 passing up through an aperture (not shown) in plate 34 and into engagement with a threaded aperture (not shown) in plate 38.

Blades 36 releasably engage (under spring tension) the outer surface of a ball 42 secured to the upper surface of the flat bottom 44 of a basket 46. The lower ends of blades 36 terminate in the same horizontal plane so that when they abut the upper surface of bottom 44, dispenser 14 and container 12 are automatically vertically aligned relative to basket 46, thus facilitating assembly of device 10.

Basket 46 is, in turn, fixedly secured to the upper end of an elongated support means in the form of a stake 48. In this regard, device 10 may, for example, be provided with a screw 50, the shaft of which passes up through apertures (not shown) in a bracket 52 (bearing downwardly directed peripheral gripping teeth 54), bottom 44 and ball 42 for threaded engagement with ball 42. Screw 50 secures bracket 52 to bottom 44 while teeth 54 securely engage the outer surface of the upper end of stake 48 to secure basket 46 and ball 42 to stake 48. Alternatively, bracket 52 may be internally threaded to match external threading on the upper end of stake 48 (not shown).

Basket 46 is disposed around and below dispenser 14 and comprises an upper ring 56, a bottom ring 58 of preferably smaller diameter than ring 56 and means interconnecting the same, which means comprises a wire mesh 60 of decorative pattern. Ring 56 is at about the level of dispenser 14. Bottom 44 includes a centrally disposed plate 62 spaced inwardly from ring 58 and wire supports 63 secured to plate 60 and ring 58 for holding plate 62 in place.

An inner ring 64, preferably of about the diameter of ring 58, is disposed within basket 46 at about the level of dispenser 14 by generally vertical spaced struts 65. Ring 64 together with basket 46 form the bird perch assembly of device 10. It will be noted that (preferably) stake 48 bears a pointed spike 66 at the lower end to facilitate ground spacement of device 10. Also, stake 48 may be hinged, as at 68, to facilitate transportation and storage of the same. Hinge locking means (not shown) may also be provided.

Device 10 can be fabricated of any suitable materials. For example, basket 46 and ring 64, as well as stake 48, bracket 52, spike 66, screws 40 and 50 and similar components can be made of metal, wood, plastic or the like, preferably metal. Container 12 and dispenser 14 preferably are fabricated of durable, easily cleanable transparent material, such as glass, plastic or the like.

Ball 42 preferably is plastic, although it can be wood, metal or the like.

Device 10 is inexpensive and attractive and is easy to assemble, disassemble, transport and use. It can be easily filled and refilled while container 12 is in place on device 10 and also when container 12 is disengaged therefrom as by separation of blades 36 from ball 42. Container 12 and dispenser 14 are of such shape as to protect bird feed against undue exposure and contamination and are equally well adapted to contain and dispense liquid or particulate bird feed. Moreover, ring 56 is well adapted as a perch for birds such as larks, robins and the like, while inner ring 64 is particularly adapted for small birds, such as humming birds and the like.

What is claimed and desired to be secured by Letters Patent is:

1. An improved bird feeding device comprising, in combination:

feed containing means comprising a feed container and a feed dispenser connected thereto;

elongated support means;

one end of said elongated support means having a pointed member connected to said support means to enable ready insertion of said support means into the ground;

connector means releasably interconnecting said elongated support means and said feed containing means; and a bird perch assembly connected to said elongated support means and encircling and adjacent to said feed dispenser, said perch assembly including:

a basket;

an inner ring within said basket;

said connector means interconnecting said inner ring and said basket and supporting said inner ring above the bottom of said basket, said connector means comprising a ball secured to the upper surface of said bottom, and spring means connected to the bottom surface of said feed dispenser and releasably received over said ball; and means securing said basket adjacent the upper end of said elongated support means.

2. The improved bird feeding device of claim 1 wherein said spring means comprises a plurality of spaced, generally downwardly projecting spring blades, the lower ends of which terminate in the same horizontal plane.

3. The improved bird feeding device of claim 1 wherein said basket comprises an upper ring, a bottom ring of smaller diameter than said upper ring and mesh interconnecting said upper and bottom rings, and wherein said bottom includes a centrally disposed plate and means securing said plate to said bottom ring.

4. The improved bird feeding device of claim 3 wherein said connector means for said inner ring includes a plurality of generally vertically oriented spaced struts and wherein the diameter of said inner ring and the bottom of said basket are substantially the same.

5. The improved bird feeding device of claim 4 wherein said spring means comprises a plurality of spaced generally downwardly projecting spring blades, the lower ends of which terminate in the same horizontal plane.

6. The improved bird feeding device of claim 5 wherein said elongated support means comprises a stake with a pointed bottom end, wherein said container is vertically supported above the bottom of said dispenser and said dispenser is generally closed, except for a plurality of feed conduits therein.

7. The improved bird feeding device of claim 6 wherein said stake is spirally twisted and hinged and comprises metal, wherein said basket comprises metal, wherein said container and dispenser are transparent, and wherein said ball comprises plastic.

* * * * *